United States Patent
Doroshenko et al.

(10) Patent No.: US 11,360,059 B2
(45) Date of Patent: Jun. 14, 2022

(54) PORTABLE MEMS GC-MS SYSTEM

(71) Applicant: Mass Tech, Inc., Columbia, MD (US)

(72) Inventors: Vladimir M. Doroshenko, Sykesville, MD (US); Victor V. Laiko, Columbia, MD (US)

(73) Assignee: Mass Tech, Inc., Columbia, MD (US)

( * ) Notice: Subject to any disclaimer, the term of this patent is extended or adjusted under 35 U.S.C. 154(b) by 0 days.

(21) Appl. No.: 15/929,133

(22) Filed: May 31, 2019

(65) Prior Publication Data
US 2020/0378930 A1    Dec. 3, 2020

(51) Int. Cl.
*G01N 30/72* (2006.01)
*H01J 49/00* (2006.01)
*G01N 30/00* (2006.01)

(52) U.S. Cl.
CPC ...... *G01N 30/7206* (2013.01); *H01J 49/0022* (2013.01); *G01N 2030/0095* (2013.01)

(58) Field of Classification Search
CPC ... G01N 2030/0095; G01N 2030/3015; G01N 2030/3053; G01N 30/30; G01N 30/6095; G01N 30/7206; H01J 49/0013; H01J 49/0022
See application file for complete search history.

(56) References Cited

U.S. PATENT DOCUMENTS 6,666,907 B1 * 12/2003 Manginell .......... G01N 30/6095
73/23.36
2016/0031047 A1 * 2/2016 Hitchcock ................ B23P 6/00
29/402.08

FOREIGN PATENT DOCUMENTS

WO    WO 2017/173447    * 10/2017   ............ G01N 30/46

OTHER PUBLICATIONS

Snyder, D.T. Miniature and Fieldable Mass Spectrometers: Recent Advances, Analytical Chemistry, 88, 2-29 (Year: 2015).*
Boeker, P. et al. Flow Field Thermal Gradient Gas Chromatography, Analytical Chemistry, 87, 9033-9041 (Year: 2015).*
Stashenko, E. et al. Gas Chromatography-Mass Spectrometry, Advances in Gas Chromatography (Year: 2014).*
Azzouz, I. et al. MEMS Devices for Miniaturized Gas Chromatography, MEMS Sensors—Design and Application (Year: 2018).*
Lee, C.-Y., et al. High-performance MEMS-based gas chromatography column with integrated micro heater, Microsyst Technol 17, 523-531 (Year: 2011).*

* cited by examiner

*Primary Examiner* — Xiaoyun R Xu
(74) *Attorney, Agent, or Firm* — Oblon, McClelland, Maier & Neustadt, L.L.P.

(57) ABSTRACT

A system and method for sample analysis using a portable gas chromatography (GC)-mass spectrometry (MS) is provided. The GC-MS system includes an injector configured to accept a sample containing a mixture of chemicals and release at least part of the sample for a separation by GC, a MEMS GC column with an integrated heater configured to accept and at least partly separate the mixture of chemicals, and a mass analyzer in a vacuum chamber configured to accept and mass-analyze the released separated chemicals. The MEMS GC column with the integrated heater is located mostly inside the MS vacuum chamber.

33 Claims, 7 Drawing Sheets

PORTABLE MEMS GC-MS SYSTEM

BACKGROUND OF THE INVENTION

Field of Invention

This invention is related to chemical analysis using gas chromatography (GC)-mass spectrometry (MS) systems. More specifically, this invention is related to using Micro-Electro Mechanical Systems (MEMS) GC with a mass spectrometry analyzer.

Description of the Related Art

Gas Chromatography-Mass Spectrometry (GC-MS) is a powerful technique widely used in chemical and biological analysis. GC provides separation of compounds essential for working with complex mixtures, while MS provides ultimate specificity to the method. GC-MS is currently considered a gold-standard technology to be used for the analysis of volatile and semi-volatiles compounds in complex mixtures, and commercial units are further enhanced with software-operable databases of mass-spectral and retention index libraries. GC-MS is thus not surprisingly among the first MS-based field-deployable techniques, and a number of portable GC-MS systems have become available commercially.

Gas chromatography is one of the most widely used methods for analyzing compounds that can be vaporized without decomposition. Typical laboratory GC systems have up to 40-m length capillary columns providing an analysis time of up to 1 hour and requiring helium or hydrogen as a carrier gas. As GC operation typically requires to ramp GC column temperature in an oven up to 350° C. and higher, it consumes a lot of power in addition to other consumables that makes a task of designing a portable GC system a real challenge. Adding a mass spectrometer as a detector to GC system makes total GC-MS system size bigger and power consumption higher so a lot of efforts have been made for miniaturizing a mass analyzer unit (see Snyder et al. Miniature and Fieldable Mass Spectrometers: Recent Advances, Anal. Chem. 2016, v.88, p. 2-29—the entire contents of this and following cited publications are incorporated by reference). In a standard GC-MS approach the portability is typically achieved along with the use of a miniature MS analyzer via reducing a column length and diameter with power reduction achieved by using low thermal mass GC columns and reducing analysis time (see Contreras et al. Hand-Portable Gas Chromatograph-Toroidal Ion Trap Mass Spectrometer (GC-TMS) for Detection of Hazardous Compounds, J. Am. Soc. Mass Spectrom. 2008, v.19., p. 1425-1434).

There has been considerable effort in the miniaturization of both the GC column and MS analyzer to achieve a low power and portable GC-MS system. A real breakthrough in GC miniaturization came with development of MEMS GC (or micro GC) technology in which a column heater is fully integrated with a micro column made by micro-electro-mechanical system process (see Manginell et al. Temperature programmable microfabricated gas chromatography column. U.S. Pat. No. 6,666,907; and Lussac et al. Review on Micro-Gas Analyzer Systems: Feasibility, Separations and Applications, Critical Rev. Anal. Chem. 2016, v.46, p. 455-468) that allowed a substantial reduction of the GC heater power consumption. While MEMS mass spectrometers are still under development (see Sims et al. MEMS mass spectrometers: the next wave of miniaturization. J. Micromech. Microeng. 2016, v.26, 023001) the integration of MEMS GC to classic miniature mass spectrometers is of a great interest as this may reduce a total instrument size and consumed power (Doroshenko et al. Development of a Low-Power Miniature GC-MS Instrument for Fieldable Applications. In: Proc. 66-th ASMS Conf. Mass Spectrometry and Allied Topics, San Diego, Calif., 2018).

Further reduction of consumed power in portable GC-MS instruments driven by a need for prolonged autonomous field use is highly desirable in portable GC-MS instruments, including MEMS GC-MS. This invention is related to designing a GC-MS system with reduced power consumed in its operation, and specifically a MEMS GC-MS system.

A standard approach for interfacing GC with MS is shown in FIG. 1 where the GC column 100 is placed inside an oven 101 and a heated gas line 102 connects the GC outlet with an MS ion source 103 which is usually located inside an MS vacuum chamber 106. The sample is injected into the column using a GC injector 107. The ion source 103 is connected to an ion guide/optics 104 which is in turn connected to a mass analyzer 105. The ion source 103 may be of different types, like electron impact (EI), photoionization, gas discharge, glow discharge, or chemical ionization (CI). The mass analyzer 105 outputs data to a data system (not shown).

When a low thermal mass GC column is used the oven is replaced with an electric resistive heater 108 integrated with the column 109 in a single bundle, as shown in FIG. 2. The column has an inlet 110 and an outlet 111. This design provides substantial savings in heating power as well as an increase in GC temperature ramp rates to achieve fast GC analysis. The reduction in heating power is due to lower thermal mass of GC column bundle and thermal isolation used but the power required to heat the GC column is still substantial due to thermal losses to a surrounding environment. The same heat losses exist if a MEMS GC column with an integrated heater is used instead of a low thermal mass GC column bundle.

SUMMARY OF THE INVENTION

In one embodiment of the present invention, there is provided a GC-MS system for analysis of chemical samples, comprising: an injector configured to accept a sample containing a mixture of chemicals and release at least part of the sample for separation by GC; a MEMS GC column configured to accept said at least part of the sample and at least partly separate the mixture of chemicals contained in the sample, said column having a heater integrated with the column, an inlet to accept said at least part of the sample, and an outlet to release at least partly separated chemicals of the mixture; a mass analyzer configured to accept and mass-analyze the released separated chemicals; a vacuum system configured to generate a vacuum required for proper operation of said mass analyzer, wherein said MEMS GC column with the integrated heater is located mostly inside said vacuum system.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
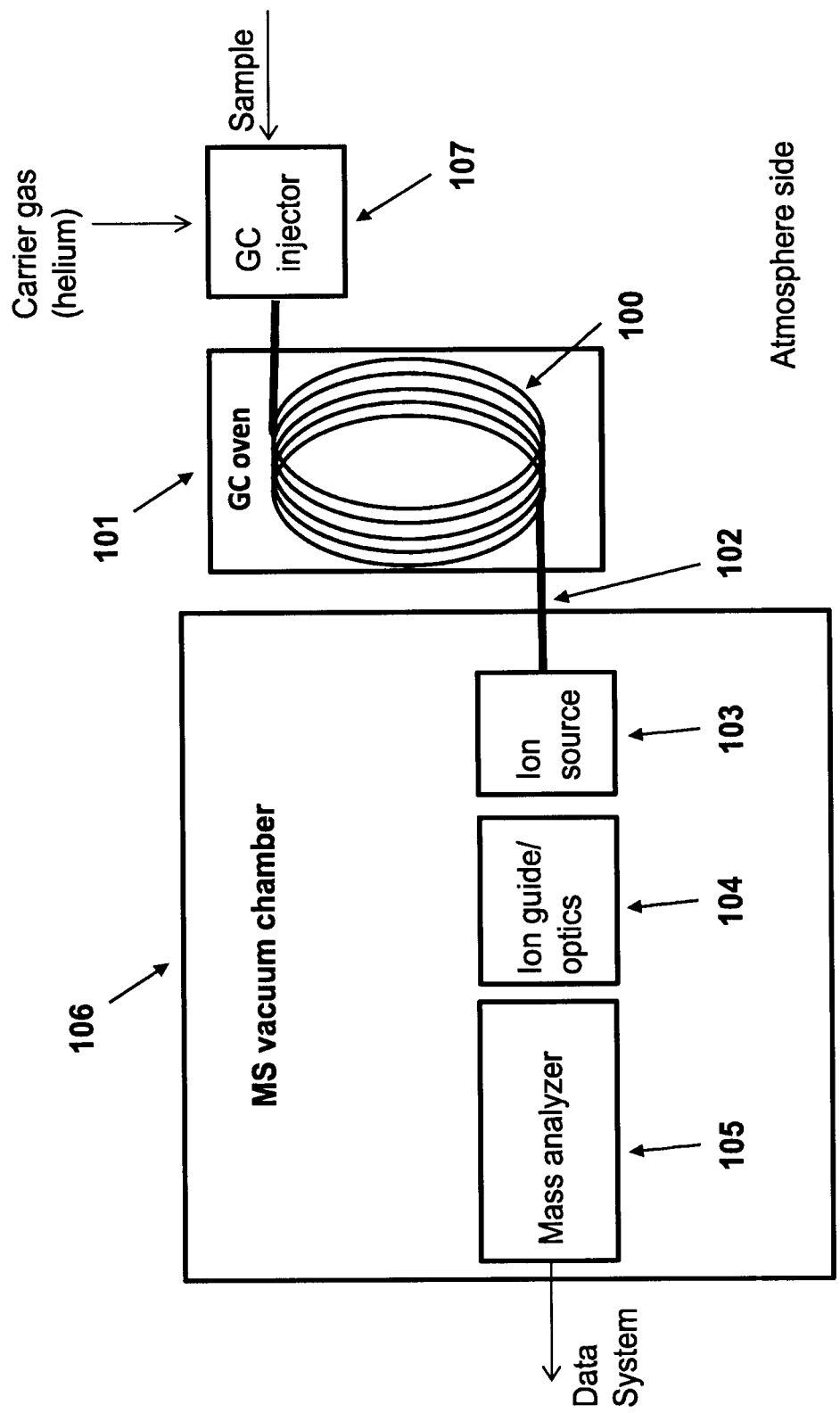
FIG. 1 shows a prior art scheme of GC-MS with a capillary GC column heated in an oven.

A MEMS device (including MEMS injector, MEMS GC, or MEMS MS) for the purpose of this invention is typically a device which is at least partly made using a micro-electro-mechanical system process.

An integrated heater for the purpose of this invention is typically made to be a part the corresponding device, which may include a sample injector, GC column, MEMS sample injector, or MEMS GC column. In contrast to heating a device in a separate oven, the integrated heater is used to heat the corresponding device directly.

A vacuum means any pressure below 1 atm typically generated for proper operation of a mass spectrometry system. Typically this vacuum is generated within a differentially pumped vacuum chamber.

An external surface of a GC column is any surface of the column between the column channel inlet and its outlet except the surface inside the column channel. A heat to increase the GC column temperature can typically be supplied through the external surface of the GC column.

A GC column mostly located in vacuum for the purposes of this invention means a GC column with most of its external surface exposed to a vacuum. Due to a unique thermal isolation property of the vacuum a high degree of the external surface exposure to the vacuum (typically more than 50%) minimizes thermal losses during heating the GC column.

A GC system typically consists of an injector to inject a sample which is typically a mixture of chemicals in a gas or vaporized form; a GC column to separate the injected sample mixture; and a detector. The injector may be of several types, including a hot injector with a splitter, cold on-column (COC) injector, or programmed temperature vaporizer (PTV) inlet. GC injectors can also be made as a MEMS device (see Azzouz et al. MEMS Devices for Miniaturized Gas Chromatography. In: MEMS Sensors—Design and Application, Ed. S. Yellampalli, 2018, IntechOpen; p. 149-169). The GC column may be a packed or capillary type having different stationary phases to separate chemicals but capillary columns have wider analytical use (see, for example, W. Jennings, Gas Capillary with Glass Capillary Columns, 1980, Academic Press). A MEMS GC (or micro GC) column is a miniature type of GC column which resembles a capillary column design by making narrow and long channels inside a silicon chip and coating them with various GC stationary phases depending on polarity of chemicals to be studied (common stationary phases in open tubular columns are cyanopropylphenyl dimethyl polysiloxane, carbowax polyethyleneglycol, biscyanopropyl cyanopropylphenyl polysiloxane and diphenyl dimethyl polysiloxane). The column temperature is typically ramped for separation of chemicals having different boiling points and this is achieved by placing a total column into an oven or using a heater integrated with a column, like in commercial low thermal mass capillary columns (for example, Fast Column Bundle, FCB, by Valco Instruments Co., Houston, Tex.). In the MEMS GC columns the integrated heater is typically made as a thin platinum film used for electric resistive heating. The detector may be of different types, like flame ionization, electron capture, thermal conductivity, photoionization, mass spectrometry, etc.

In the present invention, an MS analyzer is used as a GC detector (making a GC-MS system) and provides the most comprehensive information about the analyzed chemical species typically resulting in unambiguous chemical identification that makes the GC-MS combination extremely attractive for chemical analysis. Miniaturization of the both the GC column and MS analyzer can achieve a low power and portable GC-MS system. While MEMS GC size can be made extremely small its power consumed for GC column heating is still significant especially if high temperatures (up to 350° C. and higher) are desirable to achieve. A mass analyzer cannot be made as small as a MEMS GC yet (as MEMS MS is still under development) but some classic types of MS analyzers can be designed small enough to make MEMS GC-MS combination attractive for fieldable applications. In particular the size of ion trap MS systems can be already made to be close to 1 L including vacuum pumps. With the system according to the invention it is possible to integrate a MEMS GC with a miniature mass spectrometer, like ion trap MS to achieve a low power and portable GC-MS system.

Figure 2:
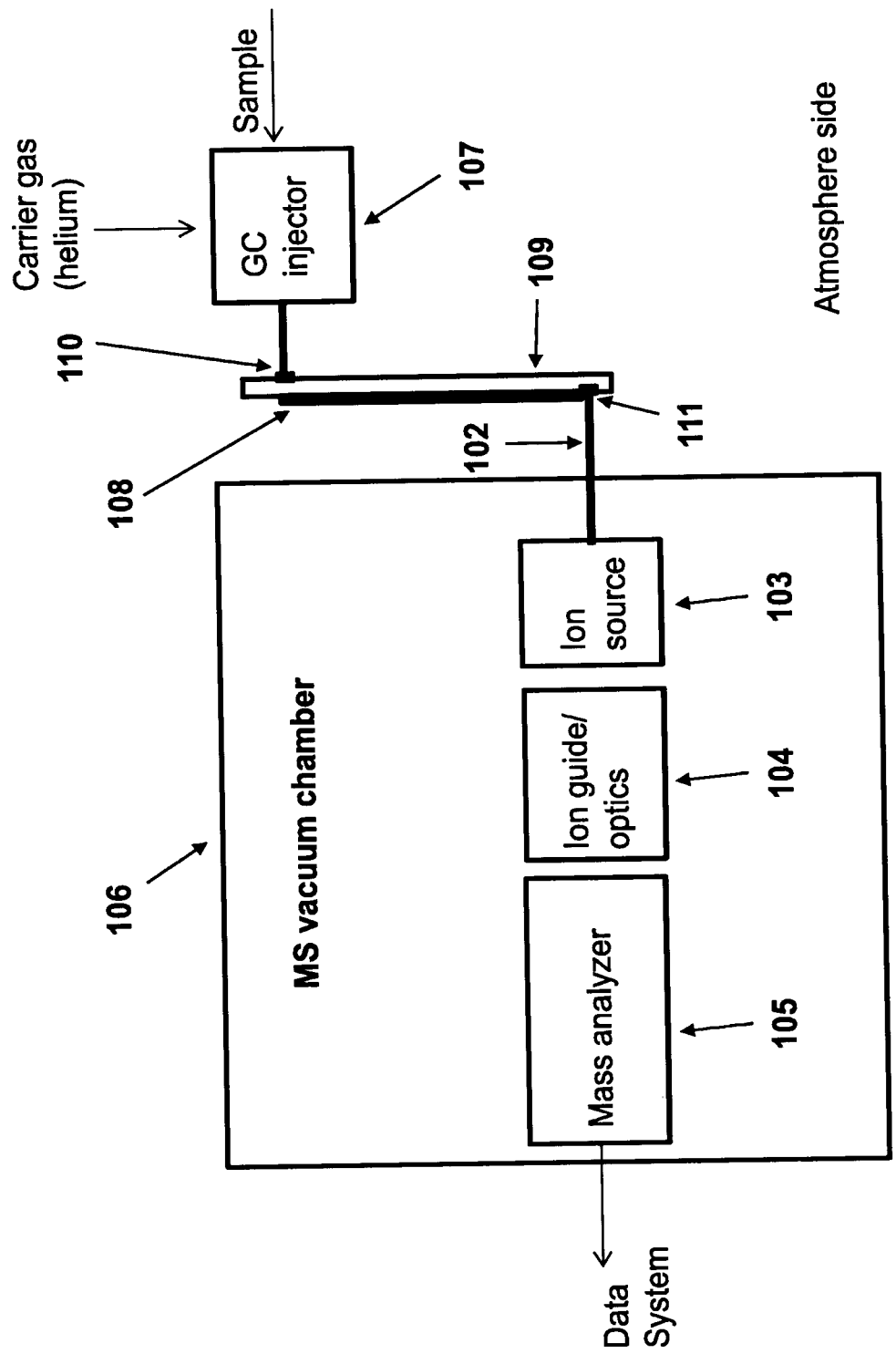
FIG. 2 shows a prior art scheme of GC-MS with a GC column having an integrated heater and located outside the mass spectrometer.
Figure 3:
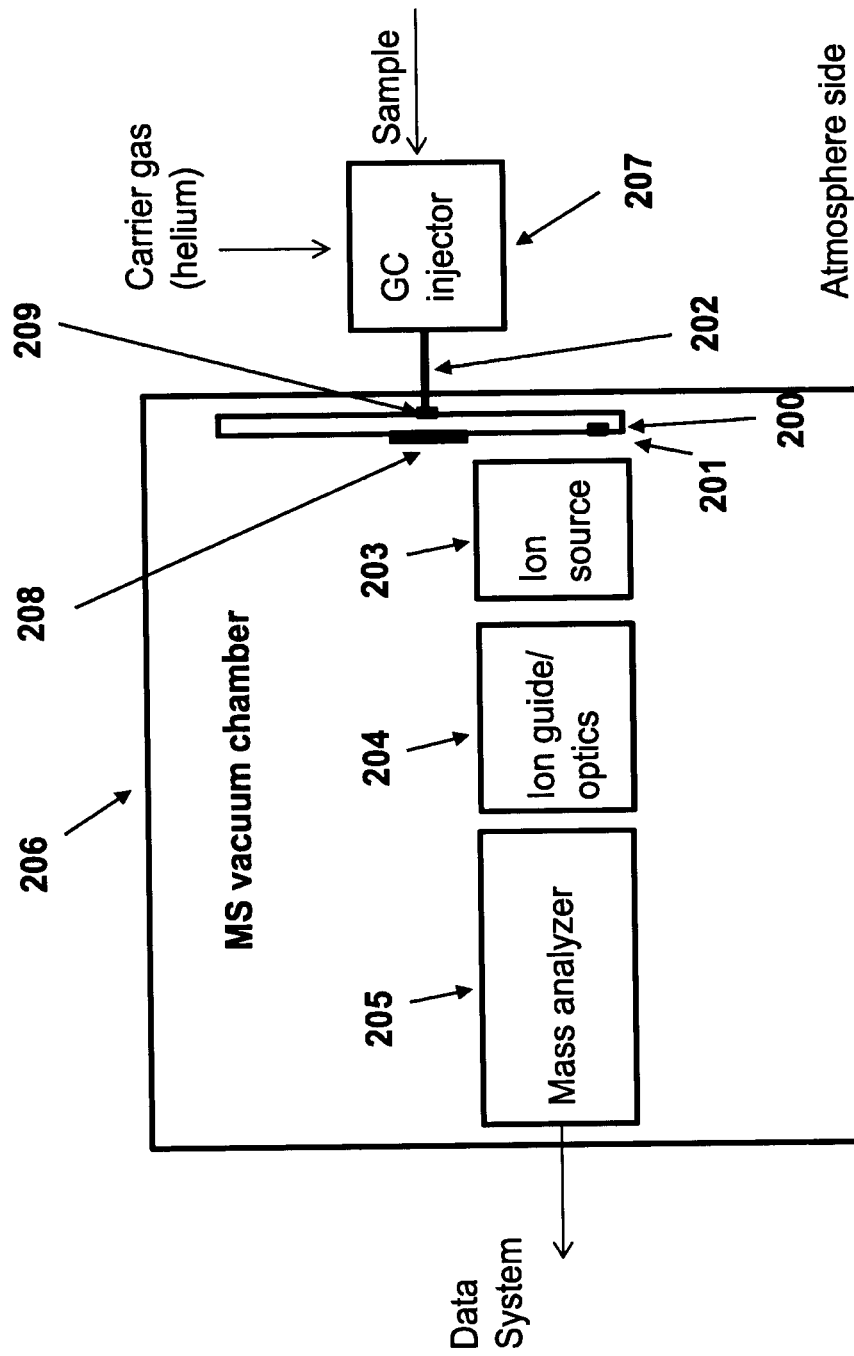
FIG. 3 shows a proposed portable GC-MS system in which to reduce a consumed power a MEMS GC column with an integrated heater is located inside a vacuum chamber of the mass spectrometer.

In addition to reducing the power consumed for GC column heating the MEMS GC-MS design according to the invention has a GC column placed inside the MS vacuum, which also simplifies an interface of MEMS GC with mass spectrometer as no heated transfer lines are used (compare the designs shown in FIG. 2 and FIG. 3). The MEMS GC chip can simultaneously be a part of an ion source with a GC outlet located directly inside an ionization chamber. This design minimizes not only the power for GC column and gas line heating but reduces the power to heat the ionization chamber as well (typically in GC-MS interface all parts on the way of the sample from GC to an ion source are required to heat up for reducing chemical noise and cross-talk). Thus, the present invention provides multiple savings in the consumed power as well as benefits in design optimization.

Figure 6:
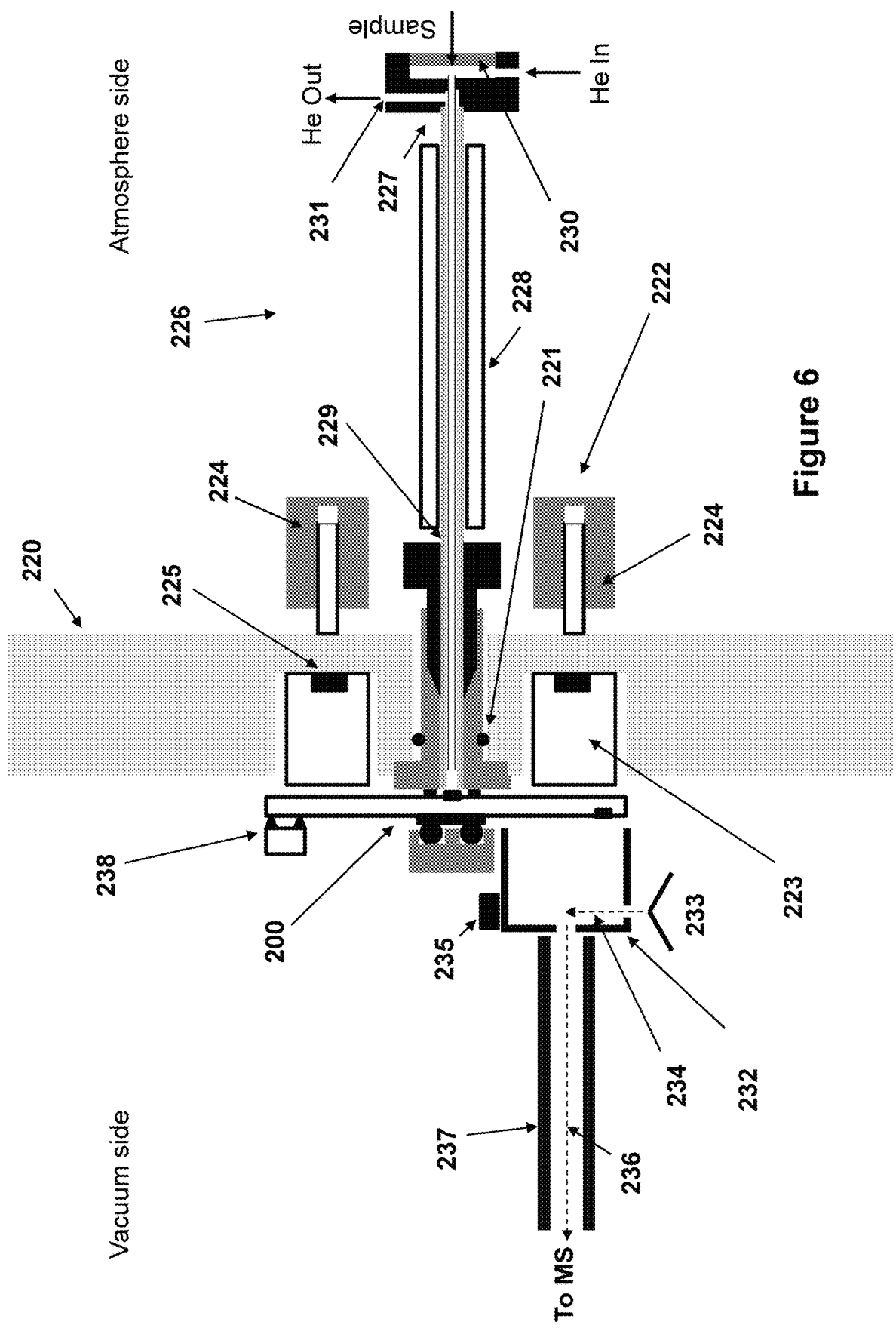
FIG. 6 shows design details of the MEMS GC-MS system according to the invention with MEMS GC column fully located inside the vacuum. A sample injector using a programmed temperature vaporizer (PTV), a system for cooling the MEMS GC column at the time between sample analysis using a periodically activated "cold finger", and an adjacent MS ionization chamber are shown.
Figure 7:
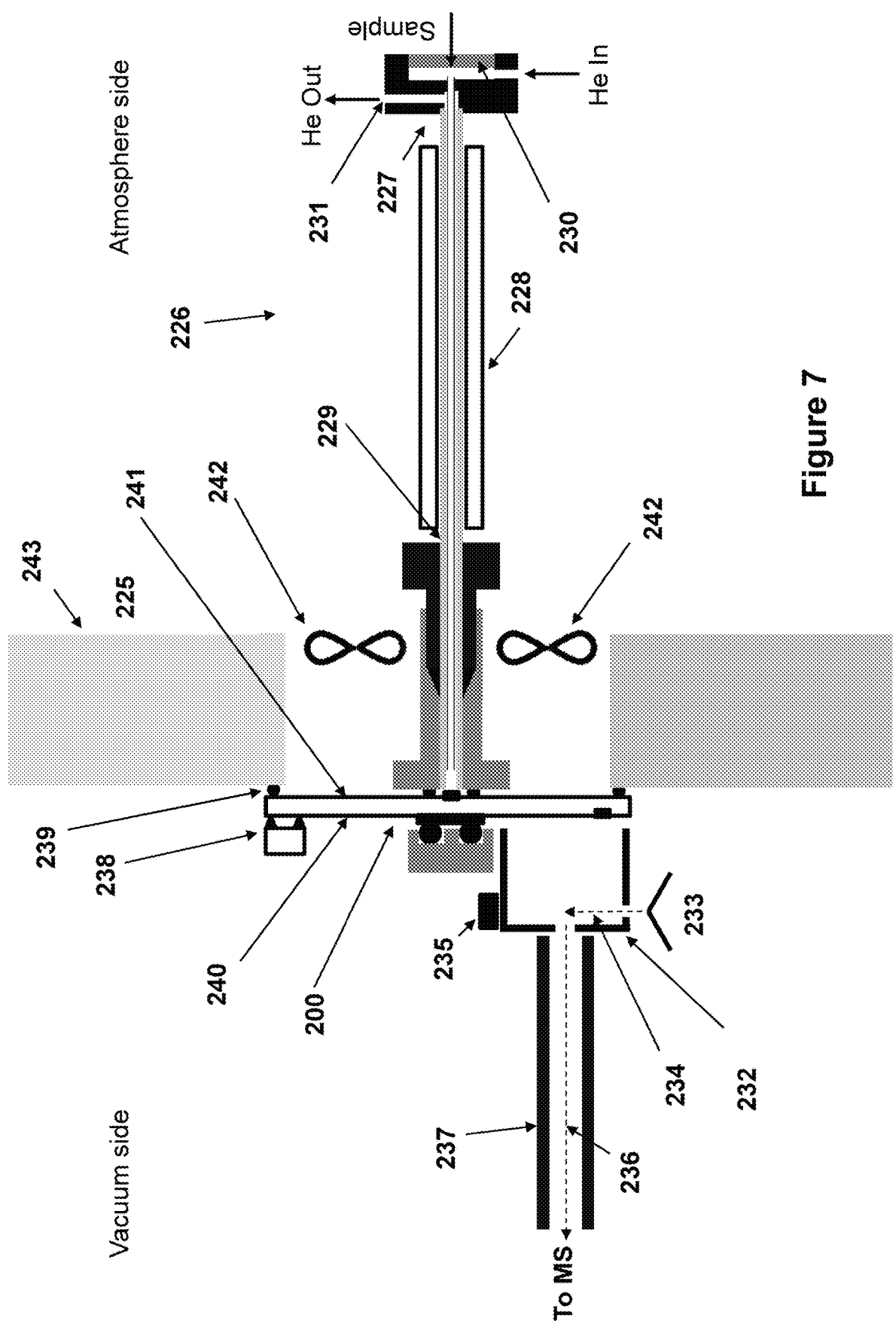
FIG. 7 shows design details of the MEMS GC-MS system according to another embodiment of the invention with MEMS GC column partly located inside the vacuum wherein one side of the MEMS GC chip is under the vacuum and the other one is at the atmosphere. A sample injector using a programmed temperature vaporizer (PTV), a system for cooling the MEMS GC column at the time between sample analysis using a periodically activated electric air fan, and an adjacent MS ionization chamber are shown.

The present invention allows reduction in the heating power by placing the whole MEMS GC column chip, or at least a substantial part of it, inside a vacuum of the MS system (FIGS. 3, 6, and 7). The vacuum is the best known natural thermal isolator so thermal losses during the GC column heating are minimized, thus, reducing the power required to heat the MEMS GC column.

The high thermal isolation properties of the vacuum can be not only beneficial as in our case of reduction in heating power but also negative if, for example, a high throughput of sample analysis is desirable. This is because minimizing power losses during column heating means also requires a long time of cooling the column for starting a new temperature ramp to analyze a next sample as the vacuum thermal isolation of the column will resist its cooling. If high throughput of sample analysis is required then some additional cooling of the GC column should be provided between temperature ramps. Because power saving in a portable instrument is of a high importance some type of non-active cooling is desirable (i.e., a cooling not requiring a power in contrast to an active cooling requiring power during the cooling stage).

The present invention can include non-active cooling by using, for example, a periodically activated cold finger. In practice this can be a metal (copper or aluminum) body having a high thermal mass (compared to a thermal mass of the MEMS GC chip) which is located in close (for example 1 mm) proximity to a MEMS GC chip and can be moved inside the vacuum to be in a thermal contact with the MEMS chip when MEMS chip cooling is required. A short (1-mm distance) motion can be achieved using a latching electromechanical solenoid located outside the vacuum chamber. The latching solenoid plunger has two stable positions which are switched by applying pulses of electric current of different polarity through the solenoid coil. Because of pulsed operation the duty cycle as well as the consumed power of the solenoid are very small which is highly desirable for a portable instrument.

MEMS GC column is just one part of GC-MS system which requires heating and, thus, associated electric power for proper operation. Another GC-MS part which is typically heated during operation is a GC sample injector. To save power for injector heating it also can be placed inside the MS vacuum in a portable GC-MS system, especially if this is a small size MEMS injector.

PREFERRED EMBODIMENT

An exemplary and non-limiting embodiment of a MEMS GC-MS interface according to the invention is described below.

A general scheme of the preferred embodiment is shown in FIG. 3. It shows a GC injector 207 to introduce a sample and a MEMS GC column chip 200 located inside an MS vacuum chamber 206 connected by a heater gas transfer line 202 (a fused silica capillary, 0.1 mm ID, typically at 240° C.). The GC column outlet 201 is located in close proximity to an MS ion source 203 so molecules of the eluted chemicals are immediately ionized and directed by MS ion optics 204 (typically a multipole ion guide but it can be also be an electrostatic optics) toward a mass analyzer 205 for MS analysis. The MS analyzer 205 can be of different types (like quadrupole, quadrupole ion trap, Orbitrap, time-of-flight, or Fourier transform ion cyclotron resonance mass analyzer) but in this embodiment a miniature ion trap mass spectrometer was used (see Misharin et al. Development and Characterization of a Field Deployable Ion Trap Mass Spectrometer with Atmospheric Pressure Interface. Anal. Chem., 2012, v.84, p. 10105-10112; Doroshenko et al. In: Proc. 66-th ASMS Conf. Mass Spectrometry and Allied Topics, San Diego, Calif., 2018). The GC injector 207 can also be of different types, such as a hot split injector, programmed temperature vaporizer (PTV), or cold on-column (COC) injector but a PTV was used in the preferred embodiment as described below.

Figure 4:
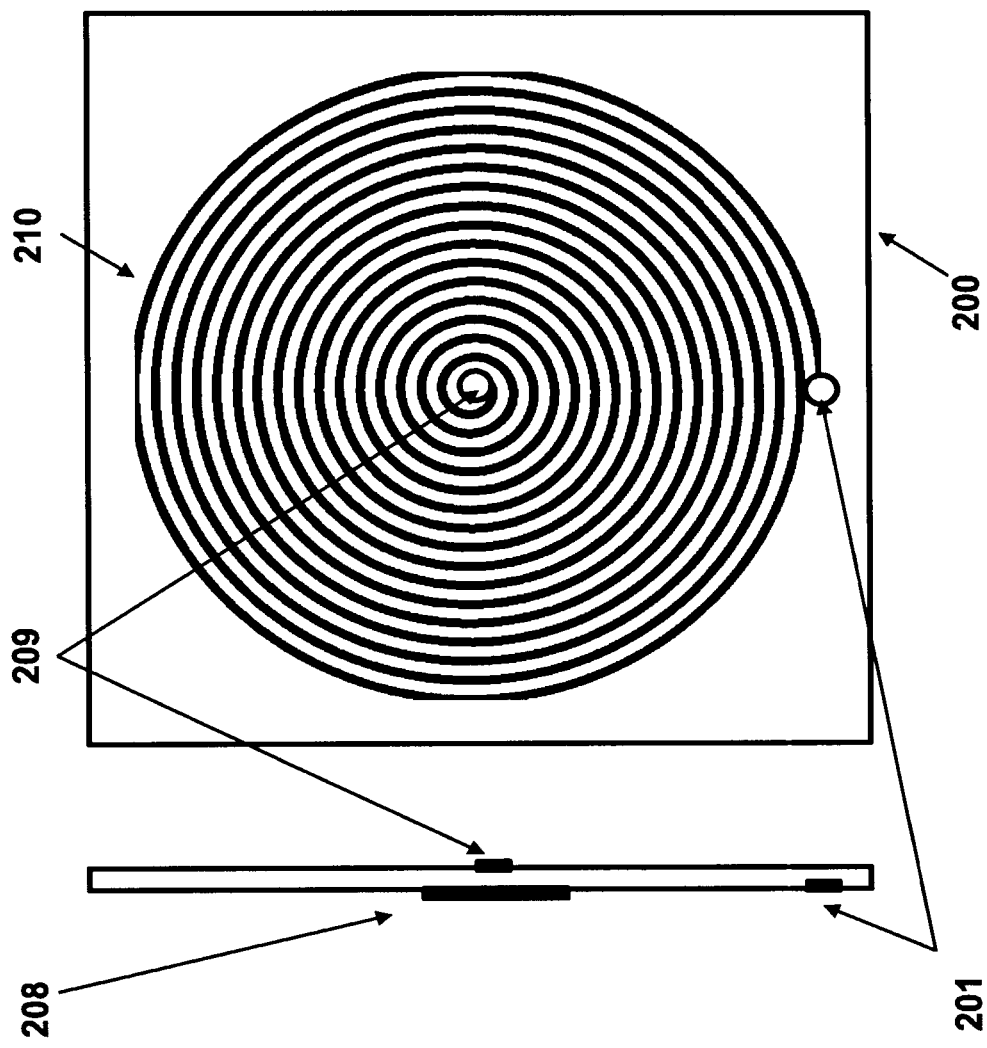
FIG. 4 shows details of design of the MEMS GC column used in the preferred embodiment.

A MEMS GC column chip 200 used in the preferred embodiment was made at Georgia Institute of Technology (see Doroshenko et al. In: Proc. 66-th ASMS Conf. Mass Spectrometry and Allied Topics, San Diego, Calif., 2018). It has dimensions of 30.25×30.25×0.8 mm with the GC column channel 210 having a size of 30 µm×220 µm×6 m. The column channel had a spiral shape with the inlet 209 located at the chip center and the outlet located near the chip edge at the chip side opposite to that of the inlet. The channel was coated with a commercial OV-1 stationary phase. The integrated heater 208 was made of a platinum resistive trace (about 80 Ohm) located near the chip center (with one more platinum trace located nearby used as a temperature sensor). The chip design details are shown in FIG. 4 for reference.

Figure 5:
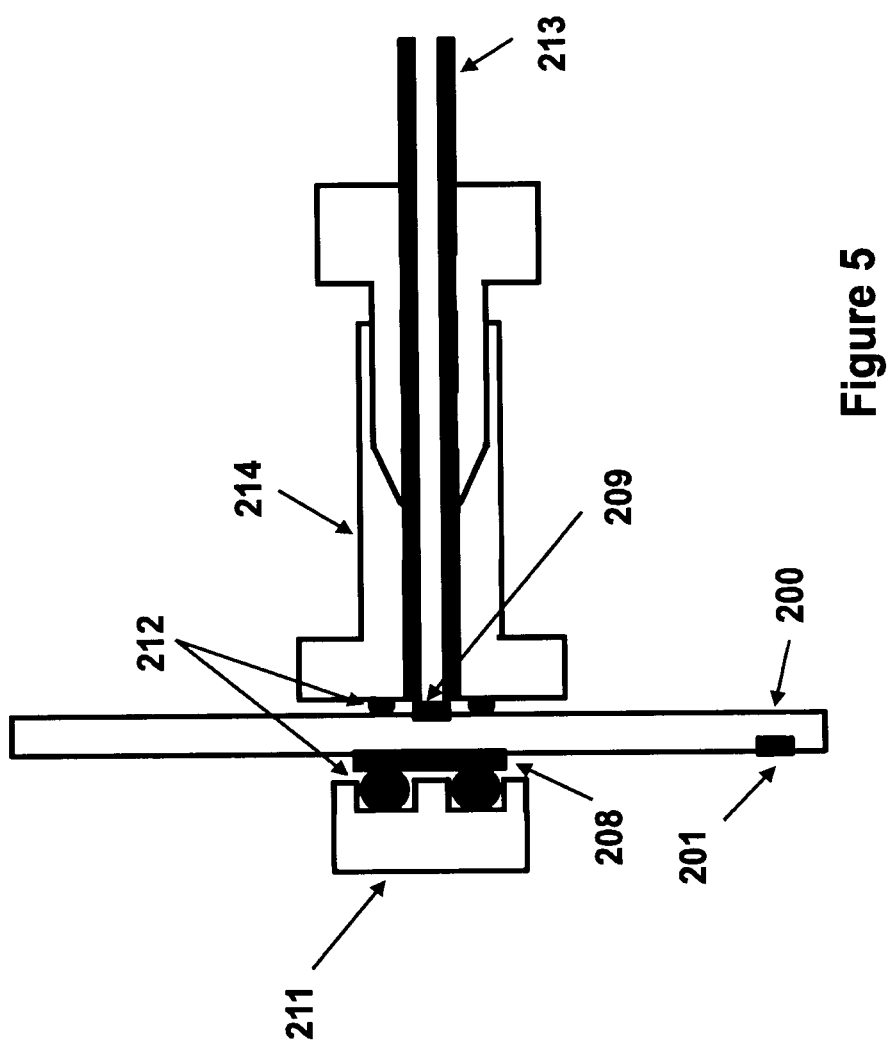
FIG. 5 shows a MEMS GC column holder designed for operation inside the MS vacuum chamber to reduce thermal losses during a GC temperature ramp.

More detail of the MEMS GC-MS interface is shown in FIG. 5. The MEMS chip is configured with a holder assembly sandwiched at the chip center between a Nanoport assembly 214 (IDEX Corp., N-333, for example) used to introduce a sample from one side and a support 211 preferably made of stainless steel from the other side (see FIG. 5). The Nanoport includes sample tubing 213 for introducing the sample in the GC column. Both the Nanoport and stainless steel support 211 are separated from the chip by O-rings 212 made of, for example Viton, making a vacuum seal with the Nanoport and providing a uniformly distributed support from the stainless steel support 211. The MEMS chip has direct thermal contact with O-rings only, not counting the electric connection to platinum traces of the integrated heater and temperature sensor at the chip edge using, for example, a miniature 6-pin spring-loaded electric connector 238 that provides minimum heat losses while the chip is heated. Typically less than 5 W is required to heat the GC chip to 240° C. in a vacuum.

In the design of MEMS GC column chip holder shown in FIG. 5 the integrated platinum film heater and holding O-rings are both located at the chip center that makes the temperature at the center to be slightly higher compared to the surrounding areas during the GC temperature ramp. This happens because of a limited rate of the heat transfer in the chip body along its radius. As a result, because in the MEMS chip design the GC column channel spirals up from the center of the chip to its edge a negative temperature gradient is created along the GC channel length that provides additional GC peak focusing (see Navaei et al. All Silicon Micro-GC Column Temperature Programming Using Axial Heating, Micromachines, 2015, v.6, p. 865-878).

The MEMS GC chip assembly 226 shown in FIG. 5 was incorporated into a wall 220 of an MS vacuum chamber, preferably an aluminum flange, as shown in FIG. 6 so the MEMS GC chip is fully located in the vacuum. The Nanoport 214 has an external O-ring seal 221 with the wall 220 that allows quick replacement of the MEMS GC chip assembly. The MEMS GC chip 200 is cooled between temperature ramps using a cooler such as a periodically activated cold finger cooler 222. The body 223 of the cold finger is preferably made of aluminum of about 12 mm thick and is disposed around the Nanoport 214 in a cavity of the MS vacuum chamber wall flange. The aluminum body is configured move about 1 mm distance so it can make thermal contact with the MEMS chip at one limit of the 1-mm travel distance (that corresponds to the MEMS chip cooling cycle) and with the aluminum wall at the other travel limit so that heat accumulated by the finger body dissipates to the vacuum chamber wall 220. This travel is provided by two latching solenoids 224 located on the air side of the vacuum wall (Digikey, p/n 1144-1322-ND, for example) that can interact across the 2-mm thick aluminum wall with two permanent magnets 225 (McMaster-Carr, p/n 58605K31, for example) press-fit into the finger cooler body by attracting them toward the wall 220 during the GC column temperature ramp or pushing toward the MEMS chip 200 during the column cooling. (The cooler body in FIG. 6 is shown in the attracted position).

In another embodiment the MEMS GC chip assembly 226 is located inside a vacuum chamber 243 partially only as shown in FIG. 7. Chamber 243 has an aperture in which the Nanoport 214 is disposed. In this case the MEMS GC chip is sealed along its edge against the vacuum chamber wall using, for example, an O-ring 239 so one side 240 of the MEMS GC column chip is located in the vacuum and the other side 241 is exposed to air. Still more than 50% of the external surface of the GC column is located inside the vacuum preventing heat loss on the vacuum side and, thus, providing substantial savings in power during column heating. The GC column is cooled between temperature ramps which can be achieved by, for example, small low-power air fan or fans 242 (Mouser, p/n 369-MF20100V11UA99, for example) controlled electrically.

An injector, such as a PTV injector is attached to the Nanoport and used for sample injection. The PTV assembly consists of inlet assembly 227 and transfer tubing assembly 228. The tubing assembly has an outer tube of with an outer diameter of 1/16" and an inner diameter of 0.04" made of nickel, for example, and inner hypodermic tube with an outer diameter of 0.034" and an inner diameter of 0.026", for example. The inner tubing is used for sample and helium gas supply into the MEMS GC column. If a sample flow split is used then a part of the gas supply (typically 90-99.9% depending on a flow split ratio) is returned back along the gap between the outer and inner tunings and discharged to outside. The tubing assembly is also equipped with a heater 228. The split ratio between the GC column flow and the discharge flow is maintained by the discharge line calibrated restriction so the discharge line gas conductivity is 10-1000 times higher than the column gas conductivity. The tubing assembly 229 is connected to the sample inlet assembly 227 having a septa 230 for sample injection using a syringe and two ports 231 for helium introduction and discharge.

The outlet of the MEMS GC column is located inside an ionization chamber 232 of the ion source. The molecules are ionized using an electron impact (EI) in the preferred embodiment but other ionization methods mentioned above can also be used for the ionization. A hot filament 233 is used for generating an electron beam 234. A small permanent magnet 235 at the opposite side of the chamber is used for electron focusing and increasing the ionization efficiency. The ions 236 created in the ionization chamber are pulled out through a small hole at the bottom by applying an attracting bias potential (10-100 V) to a hexapole ion guide 237 adjacent to the hole. The hexapole 237 delivers ions to a quadrupole ion trap mass analyzer (not shown) to determine mass-to-charge ratio of the ions. Other MS analyzers and ion extraction and delivery means, for example, electrostatic ion optics, well known to those skilled in this field can be used instead of quadrupole ion trap mass analyzer and multipole ion optics.

Additional modifications and variations of the present invention are possible in light of the above teachings. It is therefore to be understood that within the scope of the appended claims, the invention may be practiced otherwise than as specifically described herein.

The invention claimed is:

1. An apparatus for analysis of chemical samples using a gas chromatography (GC) interfaced with a mass spectrometer (MS), comprising:
   an injector configured to inject a sample containing a mixture of chemicals;
   a GC column configured to receive at least part of the sample and separate at least partly the mixture of chemicals contained in the at least part of the sample, said GC column having a GC column inlet to accept said at least part of the sample, and a GC column outlet to release the at least partly separated chemicals of the mixture;
   a heater attached to the GC column,
   a mass analyzer configured to mass-analyze the released at least partly separated chemicals; and
   a vacuum system configured to generate a vacuum, the mass analyzer being located inside the vacuum system, wherein most of an external surface of the GC column is located inside said vacuum system and exposed to the vacuum.

2. The apparatus as recited in claim 1 wherein said heater is integrated with the GC column.

3. The apparatus as recited in claim 1 wherein said GC column is a low-thermal mass capillary GC column.

4. The apparatus as recited in claim 1 wherein said heater is an electric resistive heater.

5. The apparatus as recited in claim 1 wherein said GC column is a Micro-Electro Mechanical Systems (MEMS) GC column.

6. The apparatus as recited in claim 5 wherein said heater is one of an electric resistive film heater and an electric resistive platinum film heater.

7. The apparatus as recited in claim 1 wherein said GC column has a planar shape and is disposed substantially parallel to a wall of said vacuum system.

8. The apparatus as recited in claim 1 wherein said heater is configured to generate a negative temperature gradient from the GC column inlet toward the GC column outlet.

9. The apparatus as recited in claim 1 wherein said GC column additionally includes a cooler configured to cool the GC column.

10. The apparatus as recited in claim 9 wherein said cooler is a fan.

11. The apparatus as recited in claim 9 wherein said cooler is a periodically activated cold finger cooler.

12. The apparatus as recited in claim 11 wherein said cold finger is configured to be physically detached from the GC column during said analysis and in thermal contact with the GC column after the analysis is completed.

13. The apparatus as recited in claim 11 wherein a thermal mass of said cold finger is substantially higher than a thermal mass of said GC column.

14. The apparatus as recited in claim 1 wherein said mass analyzer is at least one of quadrupole, quadrupole ion trap, Orbitrap, time-of-flight, and Fourier transform ion cyclotron resonance mass analyzer type.

15. The apparatus as recited in claim 1 wherein said mass analyzer is a MEMS mass analyzer.

16. The apparatus as recited in claim 1 wherein said mass analyzer includes an ion source configured to generate ions from molecules of the separated at least partly chemicals of the mixture released from the GC column outlet.

17. The apparatus as recited in claim 16 wherein said ion source is at least one of electron impact, photoionization, gas discharge, glow discharge, and chemical ionization type.

18. The apparatus as recited in claim 16 wherein said ion source includes an ionization chamber.

19. The apparatus as recited in claim 18 wherein said ionization chamber is heated.

20. The apparatus as recited in claim 18 wherein said GC column outlet is adjacent to said ionization chamber.

21. The apparatus as recited in claim 18 wherein said mass analyzer includes an ion guide configured to extract said ions from the ionization chamber for further mass-analysis.

22. The apparatus as recited in claim 5 wherein said MEMS GC column is designed as a thin chip having two major sides and at least a first one of said major sides is mostly located inside the vacuum system.

23. The apparatus as recited in claim 22, wherein
the vacuum system comprises a wall with an aperture; and
a second one of said major sides is disposed sealed against the wall and surrounding the aperture.

24. The apparatus as recited in claim 1 wherein said injector includes at least one of a split injector, programmed temperature vaporizer, and cold on-column injector.

25. The apparatus as recited in claim 1 wherein said injector is a MEMS injector having an integrated injector heater.

26. The apparatus as recited in claim 25 wherein said MEMS injector with the integrated MEMS heater is mostly located inside said vacuum system.

27. The apparatus as recited in claim 1, wherein the vacuum system comprises a wall with an aperture; and
the injector is disposed sealed within the aperture.

28. The apparatus as recited in claim 1, wherein the vacuum system comprises a wall with an aperture; and
the GC column is disposed sealed against the wall and surrounding the aperture.

29. A method for analysis of chemical samples using a gas chromatography (GC) column interfaced with a mass spectrometer (MS), comprising the steps of:
generating a vacuum;
positioning most of an external surface of the GC column to be exposed to the vacuum;
injecting a sample containing a mixture of chemicals into the GC column;
heating said GC column in the vacuum so the chemicals of the mixture are at least partly separated by the GC column; and
mass-analyzing the chemicals separated by the GC column.

30. The method as recited in claim 29, wherein the GC column has a planar structure with an inlet portion and a peripheral portion surrounding the inlet portion, the method comprising:
heating the GC column with a heater integrated with the GC column at a position on the GC column corresponding to the inlet portion and not integrated with the GC column in the peripheral portion.

31. The method as recited in claim 29, wherein the GC column comprises a chip, the method comprising:
heating the chip inside the vacuum.

32. The apparatus as recited in claim 1, wherein the GC inlet and GC outlet are located within the vacuum system.

33. The apparatus as recited in claim 22 wherein said thin chip is located entirely inside the vacuum system.

* * * * *